United States Patent [19]

Gallagher et al.

[11] 4,312,971
[45] Jan. 26, 1982

[54] ZIRCONIUM AND MERCURY COMPOUNDS AS CO-CATALYSTS FOR THE PREPARATION OF NONCELLULAR POLYURETHANES

[75] Inventors: James A. Gallagher, Grosse Ile; Bernardas Brizgys, Southgate, both of Mich.

[73] Assignee: BASF Wyandotte Corporation, Wyandotte, Mich.

[21] Appl. No.: 213,807

[22] Filed: Dec. 8, 1980

[51] Int. Cl.$^3$ .......................................... C08G 18/22
[52] U.S. Cl. ................................................... 528/56
[58] Field of Search ......................................... 528/56

[56] References Cited

U.S. PATENT DOCUMENTS 2,933,462  4/1960  Fischer ................................. 528/56
3,673,159  6/1972  Dijkhuizen et al. ................. 528/56
3,736,298  5/1973  Schmit et al. ........................ 528/56
4,122,046 10/1978  Waldmann ........................... 528/56

OTHER PUBLICATIONS

Britain et al., J. App. Polymer Sci., IV, 1960, pp. 207-211.

Primary Examiner—Maurice J. Welsh
Attorney, Agent, or Firm—David L. Hedden; Joseph D. Michaels

[57] ABSTRACT

The subject matter of this invention relates to the preparation of polyurethanes. It is particularly concerned with the use of certain organo-zirconium and organo-mercury compounds as co-catalysts in the preparation of polyurethanes.

9 Claims, No Drawings

ZIRCONIUM AND MERCURY COMPOUNDS AS CO-CATALYSTS FOR THE PREPARATION OF NONCELLULAR POLYURETHANES

BACKGROUND OF THE INVENTION

1. Field of the Invention

The subject matter of this invention relates to the preparation of noncellular polyurethanes. It is particularly concerned with the use of certain organo-zirconium and organo-mercury compounds as co-catalysts in the preparation of noncellular polyurethanes.

2. Description of the Prior Art

It is known that polyurethanes are prepared by the reaction of an organic polyisocyanate with an organic compound containing at least two active hydrogen atoms as determined by the Zerewitinoff method. Catalysts are usually used in the preparation of polyurethanes to increase the reaction rate. It is also known that tertiary amines and organo-metallic compounds such as organo-mercury compounds are effective catalysts for the polyurethane reaction.

The prior art also discloses that zirconium alcoholates can be used as catalysts for the preparation of certain polyurethanes. See U.S. Pat. No. 3,673,159. However, the prior art indicates that zirconium tetracetylacetonate and zirconium salts of carboxylic acids are not effective catalysts for the preparation of polyurethanes. See U.S. Pat. No. 3,673,159 and the article by J. W. Britain et al, "Catalysis of the Isocyanate-Hydroxyl Reaction," *Journal of Applied Polymer Science*, Vol. 4, pages 207–211 (1960).

SUMMARY OF THE INVENTION

The present invention is a process for preparing polyurethanes comprising reacting an organic polyisocyanate with an organic compound containing at least two active hydrogen as determined by the Zerewitinoff method in the presence of a catalytically effective amount of
(a) an organo-mercuric compound, and
(b) a zirconium compound selected from the group consisting of
1. zirconium tetraacetylacetonate, and
2. zirconium salts of carboxylic acids.

The addition of the zirconium compounds will provide faster reaction rates than when the mercury compounds are used alone. This is surprising because the zirconium compounds have no significant catalytic effect when used alone. It is advantageous to use the mercury compounds in conjunction with the zirconium compounds because lesser amounts of the mercury compound can be used without decreasing the reaction rate. This result is desirable because mercury compounds are more toxic than zirconium compounds.

DESCRIPTION OF THE PREFERRED EMBODIMENTS

As was previously mentioned, this invention resides in the discovery that certain organo-mercuric compounds and certain organo-zirconium compounds are effective as co-catalysts in the preparation of polyurethanes.

Organo-mercuric compounds having a catalytic effect in the reaction of organic polyisocyanates and compounds having active hydrogen atoms are well known in the art. U.S. Pat. Nos. 3,583,945, 3,927,053, 2,692,204, and 3,642,044, which are hereby incorporated by reference, disclose organo-mercuric compounds which can be used as catalysts in the preparation of polyurethanes. Any of these compounds can be employed in accordance with this invention.

Zirconium compounds, which will act as a co-catalyst when used in conjunction with organo-mercuric compounds having a catalytic effect, are selected from the group consisting of zirconium tetraacetylacetonate and zirconium salts of carboxylic acids. Zirconium salts of aliphatic or aromatic carboxylic acids may be employed in accordance with this invention. Preferably used as the zirconium compound are zirconium neodecanoate and zirconium tetraacetylacetonate. However, other zirconium compounds such as zirconium naphthenate, zirconium tallate, zirconium isooctate, zirconium oleate, zirconium laurate, zirconium stearate, zirconium acetate, and zirconium phthalate may be used in accordance with this invention.

The amount of zirconium compounds used in accordance with this invention is such that from 0.005 part to 0.5 part by weight of zirconium is present per 100 parts by weight of the organic compound having at least two active hydrogen-containing groups. Preferably, from 0.1 part to 0.2 part by weight of zirconium is present per 100 parts by weight of the organic compound having at least two active hydrogen-containing groups is used. The mercury in the organo-mercuric compound is generally present in proportion to the zirconium in the zirconium salts of the invention in a weight ratio of from 3:1 to 1:3. Preferably the mercury to zirconium weight ratio is from 1:1.5 to 1:3.

Polyurethanes are prepared by mixing an organic polyisocyanate with a compound having at least two active hydrogen atoms as determined by the well-known Zerewittinoff test as described in Kohler, *Journal of the American Chemical Society*, Vol. 49, p. 3181 (1927). These compounds and their methods of preparation are well known in the art. The co-catalysts are added to the compound having the active hydrogen atoms before it is reacted with the organic polyisocyanate.

The organic polyisocyanates used in the preparation of polyurethanes in the process of the subject invention correspond to the formula:

$$R''(NCO)_z$$

wherein R'' is a polyvalent organic radical which is either aliphatic, arylalkyl, alkylaryl, aromatic or mixtures thereof, and z is an integer which corresponds to the valence of R'' and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4''-triphenylmethane triisocyanate, 2,4,6-toluene triisocyanates; the aromatic tetraisocyanates such as 4,4'-dimethyldiphenylmethane-2,2',5,5'-tetraisocyanate, and the like; arylalkyl polyisocyanates, such as xylene diisocyanate; aliphatic diisocyanates, such as hexamethylene-1,6-diisocyanate, lysine diisocyanate methylester and the like; and mixtures thereof. Other organic polyisocyanates include polymethylene polyphenyl polyisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine.

The use of any one specific active hydrogen compound is not critical hereto, rather any such compound can be employed herein to react with the polyisocyanate. Suitable active hydrogen-containing functional groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α, β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propanediol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine.

Any suitable polyalkylene ether may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxide such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72 percent to about 95 percent. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylenediamine, 1,3-propylenediamine; 1,4-butylenediamine, and 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of from about 500 to 4000 and a hydroxyl number ranging from about 30 to about 600. The graft polyol has a molecular weight of from about 1500 to 4000 and a viscosity of less than 20,000 cps. at 20 to 30 percent polymer concentration.

A more comprehensive discussion of the graft polyols and their method of preparation can be found in U.S. Pat. Nos. 3,383,351, 3,304,273, 3,652,639, and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing an active hydrogen atom. A more comprehensive discussion of these polyols and their methods of preparation can be found in U.S. Pat. Nos. 3,585,185, 3,639,541 and 3,639,542.

The process described in this invention is particularly useful for preparing noncellular polyurethanes because any side reaction between the organic polyisocyanate with water is inhibited. When noncellular polyurethanes are prepared, the ratio of isocyanate groups of the organic polyisocyanate to the active hydrogens of the active hydrogen-containing compounds is 1.0:1.0 to 1.2:1.0. Inorganic fillers and other additives such as surfactants may also be included in the polyurethane formulations.

Although the co-catalyst system described in this application is preferably used for preparation of noncellular polyurethanes, it can also be used for the preparation of cellular rigid and flexible polyurethane foams.

Following are specific, non-limiting examples which are provided to illustrate the enumerated principles described herein. All parts are by weight and all temperatures are in centigrade unless otherwise specified. In the examples and table which follow, the following abbreviations are used:

F—a filler composed of calcined clay sold under the trademark SATINTONE NO. 2.
IO—yellow iron oxide pigment.
Polyol—a polyol having an average molecular weight of 2,000 prepared by oxypropylating propylene glycol.
PP—an aromatic polyisocyanate prepared by mixing crude methylene diphenyl diisocyanate and a toluene diisocyanate quasi-prepolymer, sold under the trademark MONDUR E-425.
MC—a phenyl mercury carboxylate having 45 percent mercury, sold under the trademark COSAN 27.
MDI—crude methylene diphenyl diisocyanate, a product which results from the phosgenation of an aniline-formaldehyde condensation product and which has a functionality of from 2 to 3.
ZN—zirconium neodecanoate containing 16 percent zirconium.
ZA—zirconium acetylacetonate containing 18.7 percent zirconium.

EXAMPLE 1

The following reactants (hereinafter referred to as component A) were mixed with a high shear laboratory mixer in a reaction vessel: 545 parts Polyol, 253 parts F, 4 parts IO, and 0.6 part MC.

A non-cellular polyurethane was prepared by adding component A to a reaction vessel containing 81 parts MDI. After thoroughly mixing the ingredients, the viscosity was measured starting every 2 to 3 minutes using a Brookfield RVT viscometer. The initial temperature of the mixture was approximately 25° C. The gel time, the time required to reach a viscosity of 200,000 centipoise, was measured. This formulation did not gel after 120 minutes of waiting.

EXAMPLE 2

Example 1 was duplicated except that 1.2 parts of MC were used. The gel time for this formulation was 48 minutes, 15 seconds.

EXAMPLE 3

Example 1 was duplicated except that 1.8 parts of MC were used. The gel time for this formulation was 20 minutes, 15 seconds.

Examples 1-3 are comparative examples and illustrate the effects of using the mercury compound alone.

EXAMPLE 4

Example 1 was duplicated except that 2.4 parts of ZN were used instead of the MC. It was found that the formulation did not gel after 16 hours of waiting.

Example 4 is a comparative example and illustrates that, in the stated formulation, the zirconium compound has no catalytic effect when used alone.

EXAMPLE 5

Example 1 was duplicated except that 0.6 part of MC and 1.2 parts of ZN were used as co-catalysts. The gel time was 146 minutes, 15 seconds.

EXAMPLE 6

Example 1 was duplicated except that 1.2 parts of MC and 1.8 parts of ZN were used as co-catalysts. The gel time was 31 minutes, 15 seconds.

EXAMPLE 7

Example 1 was duplicated except that 1.2 parts of MC and 2.4 parts of ZN were used as co-catalysts. The gel time for the formulation was 23 minutes, 45 seconds.

Examples 5-7 illustrate the variation in gel time, depending upon the amount of mercury and zirconium compound used. Examples 2 and 7 show that the zirconium compound has a catalytic effect when used in conjunction with the mercury compounds because the reaction time was reduced significantly by the addition of the zirconium compound while the amount of mercury compound remained constant.

EXAMPLE 8

Example 1 was duplicated except that 92 parts of PP were used as the polyisocyanate instead of crude MDI, and 1.2 parts of MC were used instead of 0.6 part. The gel time for this formulation was 32 minutes.

EXAMPLE 9

Example 8 was duplicated except that 2.2 parts by weight ZA were used as the catalyst instead of the MC. This formulation did not gel.

EXAMPLE 10

Example 8 was duplicated except that 2.2 parts by weight of ZA were used in conjunction with the 1.2 parts by weight of the MC. The gel time of the formulation was 28 minutes.

Examples 8 and 9 are comparative examples. In conjunction with Example 10, they show the catalytic effect of the zirconium compound when used with the mercury compound.

The following table summarizes the data provided in the examples.

TABLE

| Example | Mercury, Parts | Zirconium, Parts | Gel Time |
|---|---|---|---|
| 1 | 0.27 | 0 | Did not gel |
| 2 | 0.54 | 0 | 48.25 minutes |
| 3 | 0.81 | 0 | 20.25 minutes |
| 4 | 0 | 0.38 | Did not gel |

TABLE-continued

| Example | Mercury, Parts | Zirconium, Parts | Gel Time |
| --- | --- | --- | --- |
| 5 | 0.27 | 0.19 | 146.25 minutes |
| 6 | 0.54 | 0.29 | 35.25 minutes |
| 7 | 0.54 | 0.38 | 23.25 minutes |
| 8 | 0.54 | 0 | 32 minutes |
| 9 | 0 | 0.41 | Did not gel |
| 10 | 0.54 | 0.41 | 28 minutes |

The embodiments of the invention in which an exclusive privilege or property is claimed are defined as follows:

1. A process for preparing a polyurethane comprising reacting an organic polyisocyanate with an organic compound containing a least two active hydrogen atoms as determined by the Zerewitinoff method in the presence of a catalytically effective amount of
    (a) an organo-mercuric compound, and
    (b) a zirconium compound selected from the group consisting of
        1. zirconium tetraacetylacetonate, and
        2. zirconium salts of carboxylic acids.

2. The process of claim 1 wherein the weight ratio of the mercury in compound (a) to the zirconium in compound (b) is from 1:1.5 to 1:3.

3. The process of claim 2 wherein the amount of compound (b) is such that from 0.01 to 0.2 part by weight of zirconium is present per 100 parts by weight of the compound having the active hydrogen atoms.

4. The process of claim 3 wherein compound (b) is zirconium acetylacetonate.

5. The process of claim 3 wherein compound (b) is zirconium neodecanoate.

6. The process of claim 3 wherein compound (a) is a phenyl mercuric carboxylate.

7. The process of claim 4 or 5 wherein the organic polyisocyanate is crude methylene diphenyl diisocyanate.

8. The process of claim 6 wherein the organic compound containing at least two active hydrogen atoms is a polyether polyol having a molecular weight of 500 to 4000.

9. The process of claim 4 or 5 wherein the ratio of isocyanate groups of the crude methylene diphenyl diisocyanate to the hydroxyl groups of the polyether polyol is 1.0:1.0 to 1.2:1.0.

* * * * *